United States Patent [19]

Dutilh

[11] Patent Number: 4,957,768

[45] Date of Patent: Sep. 18, 1990

[54] FOOD EMULSION

[75] Inventor: Christian E. Dutilh, Amsterdam, Netherlands

[73] Assignee: Unilever Patent Holdings B.V., London, England

[21] Appl. No.: 311,064

[22] Filed: Feb. 16, 1989

[30] Foreign Application Priority Data

Feb. 18, 1988 [EP] European Pat. Off. ........ 88200292.6

[51] Int. Cl.$^5$ .............................................. A23D 7/00
[52] U.S. Cl. ...................................... 426/604; 426/7; 426/52; 426/613; 426/662
[58] Field of Search .................. 426/7, 52, 604, 613, 426/662

[56] References Cited

U.S. PATENT DOCUMENTS

| | | | |
|---|---|---|---|
| 3,892,873 | 7/1975 | Kolen et al. | 426/602 |
| 3,944,680 | 3/1976 | van Pelt et al. | 426/586 |
| 4,034,124 | 7/1977 | van Dam | 426/602 |
| 4,071,634 | 1/1978 | Wilton et al. | 426/604 |
| 4,363,763 | 12/1982 | Peterson | 426/602 |

FOREIGN PATENT DOCUMENTS 1215868 12/1970 United Kingdom .

*Primary Examiner*—Donald E. Czaja
*Assistant Examiner*—Helen Pratt
*Attorney, Agent, or Firm*—Cushman, Darby & Cushman

[57] ABSTRACT

A heat-sterilizable water and oil emulsion, preferably an O/W-emulsion, is obtained by incorporating from 0.05–5 wt. % each of a lyso-phospholipid (I) and a lipid-binding protein (II). Preferably the weight ratio between (I) and (II) is about 1:1. (I) is preferably obtained by treating a phospholipid or phospholipid-fraction with phospholipase A, and (II) is preferably blood serum albumin. Also a process of preparing the heat-sterilizable emulsions has been described.

28 Claims, No Drawings

FOOD EMULSION

This invention relates to a heat-sterilizable water and oil emulsion, particularly an oil-in-water emulsion, and to a process for the preparation thereof.

One of the requirements for oil-in-water emulsions of the mayonnaise, French dressing or salad dressing type is that these emulsions should be stable against acetic acid adapted yeasts, lactobacilli and moulds, so that, during storage of the emulsion in sealed containers, the product will not become contaminated. When providing conditions resulting in a product that is stable against acetic acid adapted microorganisms, however, there is the inherent disadvantage that the product must contain chemical preservatives, which are used to inhibit the growth of unacceptable microorganisms, and which include sorbic acid, benzoic acid, propionic acid or sulphite and/or a large proportion of acetic acid.

On the other hand there is, however, an ever increasing want for milder, preservative-free products and, to reconcile these two conflicting requirements, it would be of advantage if it were possible to sterilize the water and oil emulsion without breaking the emulsion when it is heated to sterilization temperatures, particularly with high oil contents.

It has now been found that the use of a mixture of lyso-phospholipid and a lipid-binding protein in the preparation of water and oil emulsions leads to emulsions having an improved heat stability, so that they can be heat-sterilized without breakage of the emulsion.

Accordingly, the present invention relates to a heat-sterilizable water and oil emulsion, which comprises a stabilizing amount of a mixture of a lyso-phospholipid and a lipid-binding protein.

The emulsions prepared according to the invention preferably have the aqueous phase as the continuous phase.

The amounts used of both lyso-phospholipid and lipid-binding protein are up to 5 percent by weight of the total emulsion, higher amounts being possible but not adding materially to the heat-stabilizing action. In general, from 0.05 to 5 percent by weight, and preferably from 0.1 to 3 percent by weight, of the total emulsion of each of the components of the emulsion stabilizer are used. The relative amounts of the two components may vary, but it has been found that the weight ratio of about 1 : 1 between the two components yields smooth and heat-stable products with a high viscosity. It has also been found that the consistency of the water and oil emulsions can be controlled by means of the weight ratio between the lipid-binding protein and the lyso-phospholipid.

The lipid-binding protein preferably is blood serum albumin, particularly bovine or porcine blood serum albumin.

The lyso-phospholipid is a phospholipid in which one fatty acid radical attached either at the 1- or the 2-position of the glycerol part of the phospholipid molecule has been replaced by a hydroxyl group. The lyso-phospholipid is preferably obtained by treating a phospholipid of vegetable or animal origin with phospholipase A, preferably phospholipase $A_2$, such that a degree of conversion of at least 10%, preferably at least 25%, is reached. The degree of conversion is expressed as the percentage of converted phosphatidyl choline plus phosphatidyl ethanolamine based on the total amount of phosphatidyl choline plus phosphatidyl ethanolamine present before conversion. An easy method to obtain the figures required to calculate this percentage is quantitative thin-layer chromatography. As the phospholipid to be treated with phospholipase A, also lecithin fractions, for example the ethanol-soluble and the ethanol-insoluble fractions, may be used, such as the commercially available lecithin fractions Bolec F and Bolec C (Registered Trade Marks; Unimills, The Netherlands).

Examples of suitable lyso-phospholipids are the soya bean phospholipids or egg phospholipids, which have been treated with phospholipase $A_2$, such that a degree of conversion of at least 10%, preferably of at least 25%, has been reached. Commercially available products which can be used are Bolec I, Bolec FS-M and Bolec CM (Registered Trade Marks; Unimills, The Netherlands).

The water and oil emulsions according to the present invention contain from 5 to 85 percent by weight, preferably from 40 to 85 percent by weight of oil. The oil may also comprise a small amount of solid fat. By fat we understand triglyceride which is hard at room temperature (15–25° C.). The oil and/or the fat may be of vegetable or animal origin and may be a synthetic oil and/or fat. It may be a single oil or fat or fat fraction or a mixture of oils or fats and/or fat fractions. At least part of the oil and/or fat may be replaced by a liquid or solid low-calorie fat replacer Particularly suitable fat replacers are the edible polyesters of polyhydric alcohols having at least four free hydroxyl groups, such as polyglycerols, sugars or sugar alcohols, and saturated or unsaturated, straight or branched alkyl chain $C_8$–$C_{24}$ fatty acids. The polyhydric alcohol fatty acid polyesters include any such polyesters or mixtures thereof of which, on an average, at least 70% of the polyhydric alcohol hydroxyl groups have been esterified with the fatty acids. Also fatty alkyl ether derivatives of glycerol, esters of $C_8$–$C_{24}$ fatty alcohols and polycarboxylic acids, waxes and microcrystalline cellulose can be used for replacing at least part of the oil or the fat.

The water and oil emulsions according to the present invention may also comprise vinegar, lime or lemon juice, edible acids, sweetening agents, salt, herbs, spices, mustard, flavouring agents, vegetable particles, emulsifying agents, colouring agents, gums and stabilizers, but the amount and the type of these additives should be such that the emulsions obtained will be mild and preservative-free.

The present invention also relates to a process of preparing oil and water emulsions, in which a stabilizing amount of a mixture of a lyso-phospholipid and a lipid-binding protein is incorporated in the emulsion.

In general, from 0.05 to 5 percent by weight of the total emulsion of each of the components of the emulsion stabilizer are used. The weight ratio of the two components may vary, but preferably this ratio is about 1 : 1.

The invention is now illustrated by the following examples which are not to be construed as limiting the scope of the present invention.

EXAMPLE I

A mayonnaise was prepared, using the following recipe:

| | |
|---|---|
| Soybean oil | 708 g |
| Water | 200 g |

-continued

| | |
|---|---|
| Sugar | 16 g |
| Sodium chloride | 2 g |
| Acetic acid solution (10%) | 58 g |
| Bovine blood serum albumin | 8 g |
| Defatted ethanol-soluble fraction of soybean phospholipid which has been treated with phospholipase $A_2$ | 8 g |
| | 1000 g |

The bovine blood serum albumin was dissolved in water while vigorously stirring by means of an Ultraturrax. The solution obtained was heated to 40–50° C. and subsequently the lyso-phospholipid was added and dispersed, using the Ultraturrax mixing device. Then all dry ingredients were added and subsequently the oil addition was started under stirring in a Hobart mixer. After addition of two thirds of the oil, the acetic acid solution was added while stirring. The final mixture obtained was homogenized, upon which a smooth, mild-tasting mayonnaise was obtained, which could be heated in a water bath at 100° C. for 30 minutes without the emulsion breaking.

EXAMPLES II–XII

In the following examples, mayonnaises were prepared in the same way as described in Example I, using the same recipe with the exception of the emulsion stabilizer, which was changed in composition as indicated in Table I. In order to arrive at a total charge of 1000 grams, the amount of water was changed to compensate for a smaller or larger total amount of emulsion stabilizer. In all the Examples the final emulsions obtained could be heated to 100° C. for 30 minutes without breaking the emulsion, and for the remainder they were rated, using the following appreciation marks:

| Mark | Emulsion appearance | Particle size μm | Bostwick value after heating 30 min. at 100° C. in cm/30 s |
|---|---|---|---|
| 1 | Thin | 5–10 | 5–10 |
| 2 | Thin | 4–10 | 2–5 |
| 3 | Thick | 1–5 | 0–2 |

TABLE I

| Example | Bovine blood serum albumin (wt. %) | Lyso-phospholipid as in Example I (wt. %) | Rating |
|---|---|---|---|
| II | 0.2 | 0.3 | 2 |
| III | 0.2 | 0.4 | 2 |
| IV | 0.4 | 1.0 | 1 |
| V | 0.4 | 1.2 | 1 |
| VI | 0.8 | 1.6 | 2 |
| VII | 0.8 | 1.2 | 3 |
| VIII | 0.8 | 0.4 | 3 |
| IX | 1.3 | 1.5 | 3 |
| X | 1.3 | 1.2 | 3 |
| XI | 1.3 | 0.8 | 3 |
| XII | 1.3 | 0.4 | 3 |

From these results it can be concluded that the weight ratio between the lipid-binding protein and the lysophospholipid may vary widely.

EXAMPLES XIII–XXII

In the following examples mayonnaises were prepared in the same way as described in Example I, using the same recipe with the exception of the emulsion stabilizer, which was changed in composition as indicated in Table II and Table III In all examples the final emulsion obtained could be heated to 100° C. for 30 minutes without breaking the emulsion. The emulsions were rated as indicated for Examples II–XII.

TABLE II

| Example | Porcine blood serum albumin (wt. %) | Lyso-phospholipid as in Example I (wt. %) | Rating |
|---|---|---|---|
| XIII | 0.4 | 0.4 | 2 |
| XIV | 0.8 | 0.8 | 1 |
| XV | 1.2 | 0.8 | 2 |
| XVI | 1.6 | 1.2 | 2 |

TABLE III

| Example | Bovine blood serum albumin (wt. %) | Lyso-phospholipid Type | Amount (wt. %) | Rating |
|---|---|---|---|---|
| XVII | 0.8 | Soya phospholipid treated with phospholipase $A_2$ | 0.5 | 3 |
| XVIII | 0.4 | Soya phospholipid treated with phospholipase $A_2$ | 0.4 | 3 |
| XIX | 0.8 | Ethanol-insoluble fraction of soya phospholipid treated with phospholipase $A_2$ | 0.5 | 3 |
| XX | 0.8 | Ethanol-soluble fraction of soya phospholipid treated with phospholipase $A_2$ | 0.6 | 3 |
| XXI | 0.8 | Ethanol-soluble fraction of soya phospholipid treated with phospholipase $A_2$ | 2.4 | 2 |
| XXII | 0.8 | Ethanol-soluble fraction of soya phospholipid treated with phospholipase $A_2$ | 4.0 | 1 |

Comparative Example A

A mayonnaise was prepared, using the following recipe:

| | |
|---|---|
| Soya bean oil | 708 g |
| Water | 200 g |
| Sugar | 16 g |
| Sodium chloride | 2 g |
| Acetic acid solution (10%) | 58 g |
| Chicken egg white | 8 g |
| Defatted ethanol-soluble fraction of soya bean phospholipid treated with phospholipase $A_2$ | 8 g |
| | 1000 g |

The mayonnaise was prepared as described in Example I. Upon heating the mayonnaise at 100° C. for 30 minutes the emulsion broke.

Comparative Example B

Comparative Example A was repeated, but now using 8 g of sodium caseinate instead of 8 g of chicken egg white. The mayonnaise obtained was already broken at 20° C.

These two comparative examples clearly show that it is essential to use a lipid-binding protein as one of the components of the emulsion stabilizer.

What is claimed:

1. A heat-sterilizable water and oil emulsion, which comprises a stabilizing amount of a mixture of a lyso-phospholipid and a lipid-binding protein.

2. An emulsion according to claim 1, which is an oil-in-water emulsion.

3. An emulsion according to claim 1 in which the amounts of lyso-phospholipid and of lipid-binding protein each are from 0.05 to 5 percent by weight of the total emulsion.

4. An emulsion according to claim 1 in which the amounts of lyso-phospholipid and of lipid-binding protein each are from 0.1 to 3 percent by weight of the total emulsion.

5. An emulsion according to claim 1 in which the weight ratio between the lyso-phospholipid and the lipid-binding protein is 1 : 1.

6. An emulsion according to claim 1 in which the lipid-binding protein is blood serum albumin.

7. An emulsion according to claim 1 in which the lyso-phospholipid is obtained by treating a phospholipid or a phospholipid-fraction with phospholipase A.

8. An emulsion according to claim 1 in which the lyso-phospholipid is obtained by treating a phospholipid or a phospholipid-fraction with phospholipase A such that a degree of conversion of at least 10% is reached.

9. An emulsion according to claim 7, in which the phospholipase is phospholipase $A_2$.

10. An emulsion according to claim 8, in which the phospholipase is phospholipase $A_2$.

11. An emulsion according to claim 1 in which the oil content is from 5 to 85 percent by weight of the total emulsion.

12. An emulsion according to claim 1 in which the oil content is from 40 to 85 percent by weight of the total emulsion.

13. An emulsion according to claim 1 in which at least part of the oil is replaced by a low-calorie fat replacer selected from the group consisting of the edible polyesters of polyhydric alcohols having at least four free hydroxyl groups at least 70% of the hydroxyl groups on an average being esterified with saturated, or unsaturated, straight alkyl chain or branched alkyl chain $C_8$–$C_{24}$ fatty acids, fatty alkyl ether derivatives of glycerol, esters of $C_8$–$C_{24}$ fatty alcohols and polycarboxylic acids, waxes, microcrystalline cellulose, and mixtures thereof.

14. A process of preparing a heat-sterilized water and oil emulsion, comprising the steps of:
(a) preparing a solution of a lipid binding protein;
(b) heating the solution obtained in step (a);
(c) dispersing a lyso-phospholipid in the solution of step (b);
(d) adding an oil to the solution of step (c);
(e) homogenizing the solution of step (d) so that an emulsion is formed; and
(f) heat sterilizing the emulsion of step (e).

15. A process according to claim 14, in which the amounts of lyso-phospholipid and of lipid-binding protein each are from 0.05 to 4 percent by weight of the total emulsion.

16. A process according to claim 14, in which the amounts of lyso-phospholipid and of lipid-binding protein each are from 0.1 to 3 percent by weight of the total emulsion.

17. A process according to claim 14, in which the weight ratio between the lyso-phospholipid and the lipid-binding protein is 1 : 1.

18. A process according to claim 14, in which the lipid-binding protein is blood serum albumin.

19. A process according to claim 14, in which the lyso-phospholipid is obtained by treating a phospholipid or a phospholipid-fraction with phospholipase A.

20. A process according to claim 14, in which the lyso-phospholipid is obtained by treating a phospholipid or a phospholipid-fraction with phospholipase A such that a degree of conversion of at least 10% is reached.

21. A process according to claim 19 in which the phospholipase is phospholipase $A_2$ 22. A process according to claim 14, in which from 5 to 85 percent by weight of the total emulsion of oil is incorporated therein.

23. A process according to claim 14, in which from 40 to 85 percent by weight of the total emulsion of oil is incorporated therein.

24. A process according to claim 14, in which at least part of the oil is replaced by a low-calorie fat replacer selected from the group consisting of the edible polyesters of polyhydric alcohols having at least four free hydroxyl groups, at least 70% of hydroxyl groups on an average being, esterified with saturated, unsaturated, straight alkyl chain or branched alkyl chain $C_8$–$C_{24}$ fatty acids, fatty alkyl ether derivatives of glycerol, esters of $C_8$–$C_{24}$ fatty alcohols and polycarboxylic acids, waxes, microcrystalline cellulose, and mixtures thereof.

25. The process according to claim 14, wherein the solution in step (b) is heated to 40–50° C.

26. The process according to claim 14, further comprising the step adding sugar and sodium chloride to the solution of step (c).

27. The process according to claim 14, further comprising adding an aqueous acid solution to the solution of step (d).

28. The process according to claim 27, wherein the aqueous acid solution is an acetic acid solution.

* * * * *